May 13, 1969 J. G. CADIOU 3,443,843
BRAKING APPARATUS
Filed March 13, 1967
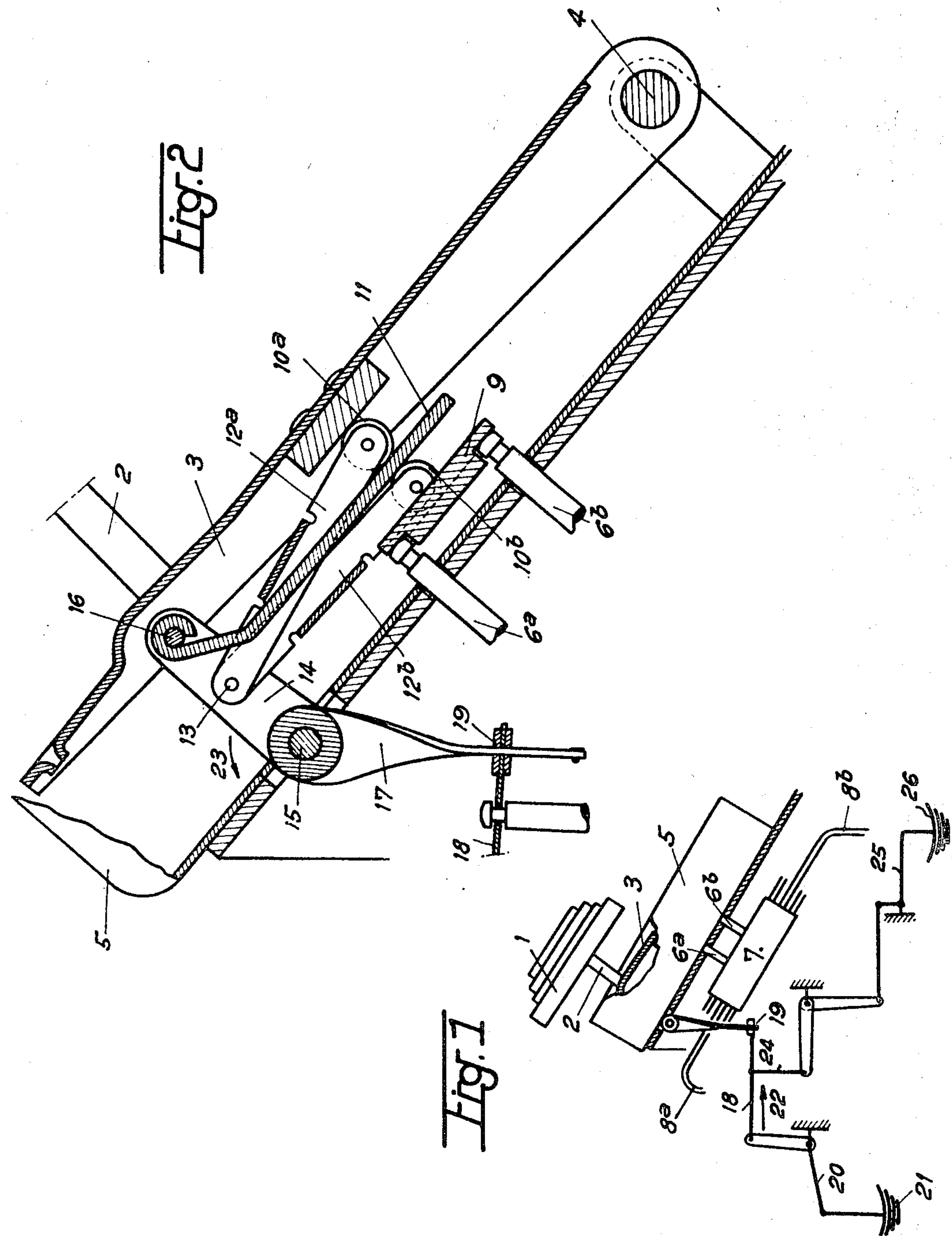

3,443,843
BRAKING APPARATUS
Jean Georges Cadiou, Paris, France, assignor to Societe Anonyme Andre Citroen, Paris, France
Filed Mar. 13, 1967, Ser. No. 622,782
Claims priority, application France, Mar. 15, 1966, 53,544
Int. Cl. B60t 8/18, 13/00
U.S. Cl. 303—22 3 Claims

ABSTRACT OF THE DISCLOSURE

Vehicle braking apparatus including a brake force distributor having a floating balance rod, has an arrangement to vary the point of application of a brake actuator on the floating balance rod using a roller assembly to eliminate any sliding action.

This invention relates to braking apparatus for vehicles.

Since the driver of a four-wheeled vehicle does not know the traction of his vehicle, in order to ensure the effectiveness of braking, for all values of deceleration, it is necessary that the ratio of the braking couple on an axle to the instantaneous load on the same axle, be the same for the front and for the rear.

The instantaneous load depends upon the static load $M_1$ on the front axle, upon the static load $M_2$ on the rear axle, upon the deceleration $\gamma$ of the vehicle and upon the height $h$ of the center of gravity. It follows that the ratio of the braking couples C1 and C2 exerted on the front and on the rear wheels respectively should obey a law of braking distribution of the form: $C1=f(M_1, M_2\ h, \gamma)$.

In the majority of automobile vehicles, the function $f$ is kept constant, that is to say that neither the load on the front axle, or that on the rear axle, or the height of he centre of gravity, or the deceleration has any effect on the distribution of the braking couples.

Hydraulic braking apparatus are, however, known which include a distributor for ensuring the separate supply of front and rear braking circuits and in which the ratio of the front braking pressure to the rear braking pressure is caused to vary as a function of static load. More often than not, this distributor includes a floating balance rod which controls two regulators and to which the control force is applied by means of a roller whose position can be varied as a function of the vehicle load, so as to cause the arms of a lever of the balance rod to vary. The position of the roller can, for example, be made dependent on the bending of the rear suspension springs or the pressure of fluid in a hydraulic or pneumatic suspension. Such apparatus are described, for example, in the French Patents 1,121,624 and 1,407,780.

But these apparatus cause the function $f$ to vary only as a function of the static load $M_1$; they assume that the magnitudes $M_2$, $h$, and $\gamma$ are constants, which amounts to admitting that the height $h$ and the deceleration $\gamma$ keep the values $h_0$ and $\gamma_0$ which are the actual values determined under cruising conditions. In these apparatus, the roller is wedged by the pressure which is exerted on it during braking and so cannot be displaced by the variation of the distribution of load due to the action of braking, to take up the position that it should theoretically occupy. For reasons of safety, the distributor is controlled in a manner to obtain a ratio of braking pressures which will be correct for a high deceleration. But under low deceleration, this ratio has no longer the desired value; the pressure in the front braking circuit is very large and the front brake linings wear out prematurely.

The present invention provides braking apparatus for a vehicle having at least two axles, said appartus including a brake force distributor including a floating balance rod, and a control arrangement, said control arrangement comprising two rollers each carried by a rod and placed in rolling relationship with and on each face of a plate, the two rollers and the plate being interposed between the balance rod and a brake control member, means for causing a regulating member to pivot through an angle proportionl to the load on one of the axles and inversely proportional to the load on the other axle, and means interconnecting the two rods, the plate and the regulating member whereby under varying loads, the two rods will be equally displaced and the plate will be displaced by twice the displacement of the rods.

The present invention further provides braking apparatus for a vericle comprising a brake force distributor having a floating balance rod, an arrangement whereby to vary the point of application of brake actuator means on the floating balance rod and means responsive to the load on the axles of the vehicle for controlling said arrangement in relation to said arrangement including rotatable means whereby to vary said point of application in a non-sliding manner during braking.

An embodiment of braking apparatus in accordance with the invention will now be described, by way of example, with reference to the accompanying diagrammatic drawings, in which:

FIGURE 1 is a schematic view of the apparatus; and

FIGURE 2 is a sectional view of the distributor in the apparatus of FIGURE 1.

In the drawing, a brake pedal 1, controls through the intermediary of a rod 2, a control lever 3 which is pivotally mounted at 4 on a support 5. The lever 3 actuates, in a manner to be described hereafter, slide valves *6a* and *6b* (shown in part) of a double compensated distributor 7 connected by means of a conduit *8a* to the front braking circuit and by means of another conduit *8b* to the rear braking circuit. When one of these slide valves, for example the slide valve *6a*, is urged towards the distributor, the brake fluid is transmitted along the conduit *8a* with a pressure which is a function of the load on the slide valve.

The slide valves *6a* and *6b* are controlled by a floating balance rod 9. Two rollers *10a* and *10b*, disposed facing one another and separated by a plate 11 substantially parallel to the lever 3, are provided at the ends of two rods *12a* and *12b*; the latter are both pivoted at a point 13 on a lever 14 fixed on a pin 15 carried by the support 5. The arrangement formed by the rollers *10a* and *10b* and the plate 11 is interposed between the lever 3 and the balance rod 9. The plate 11 is itself pivoted at 16 on the lever 14, the pivotal point 13 of the rods *12a* and *12b* being situated midway between the pivotal point 16 and the axis 15.

A lever 17 connected to means sensitive to the vehicle load is fixed to the pin 15. When this load varies, for example, as a result of deceleration due to braking, the lever 17 tends to pivot. This pivoting, which is not possible on braking, with known apparatus comprising a distributor with a balance rod, is here made possible by the plate 11 which entrains the rollers *10a* and *10b* while causing them to roll and while imparting to the rods *12a* and *12b* a displacement the amplitude of which is half that of the displacement of the plate 11.

In the embodiment shown, means are provided for causing the lever 17 to pivot through an angle which is both proportional to the load on the front axle and inversely proportional to the load on the rear axle.

To this end, a floating lever 18 carries at one of its ends a slotted member 19 in which the lever 17 is slidably mounted. The lever 18 is arranged for displacement parallel to itself as a function of the load on the front axle. In the case of a fluid suspension, for example, the lever 18 can be connected to a piston or bellows subjected to the fluid pressure in the front axle suspension. In the example shown in the drawing, the lever 18 is in fact, connected to a member 20 which is movable as a function of the bending of the front suspension springs 21. The arrangement is such that, when the load on the front axle increases, the lever 18 moves in the direction of the arrows 22, so as to cause the levers 17 to pivot in the sense of the arrows 23. The point of application of the control force on the balance rod 1 is thus displaced towards the slide valve *6a*.

In addition, a small rod 24, co-operates with the lever 18, causing displacement of the slotted member 19 with respect to the lever 17, as a function of the rear axle load. For example, in the case of a fluid suspension, the small rod 24 can be connected to a piston or bellows subjected to the fluid pressure in the rear axle suspension. In the example shown in the drawing, the small rod 24 is in fact connected to a member 25 which is movable as a function of the load on the rear suspension springs 26. The arrangement is such that, when the load on the rear axle increases, the slotted member 19 moves towards the pin 15, so as to reduce the effective length of the lever arm 17 to which a displacement of the lever 18 is applied, whereby to increase the influence of variations in load on the front axle.

The braking apparatus comprises a distributor of the type having a floating balance rod ensures that the ratio of the braking couples varies simultaneously as a function of the static loads $M_1$ and $M_2$, of the deceleration $\gamma$, and of the height $h$ of the centre of gravity; thereby making this ratio dependent on the actual instantaneous loads.

In the embodiment the braking is adapted to requirements, whatever the position of the centre of gravity of the load may be. In particular, the braking is dependent on the transfer of the load, which is itself a function of the height of the load, and thus the height causes the ratio of braking to vary.

I claim:

1. In braking apparatus for a vehicle having first and second axles, said apparatus including
- a floating balance rod,
- the improvement comprising a control arrangement including,
  - a plate,

- two rods,
  - two rollers each carried by a said rod,
  - a brake control member,
  - a regulating member,
  - means for causing the regulating member to pivot through an angle proportional to the load on the first said axle and inversely proportional to the load on the second said axle, and
- means responsive to varying loads on said axles and inter-connecting the two rods, the plate and the regulating member, to displace the rods equally and displace the plate by twice the displacement of the rods,
- each said roller being in rolling relationship with and each on a respective face of said plate and the roller and plate lying between said balance rod and said control member.

2. Apparatus according to claim 1 including
- means pivoting said regulating member about a fixed axis,
- means pivoting said plate with respect to said regulating member, and
- means coaxially pivoting said rods with respect to said regulating member midway between the pivotal axis of said regulating member and said plate.

3. Braking apparatus for a vehicle having a first axle and a second axle, said apparatus comprising a floating balance rod, two other rods, two rollers, each of said rollers being rotatably mounted on one of said other rods, a brake control member, a regulating member, means for causing said regulating member to pivot through an angle which angle is proportional to the load on said first axle and inversely proportional to the load on said second axle, and means responsive to varying loads on said axles and interconnecting said two other rods and said regulating member to displace said two other rods equally, said rollers lying between said balance rod and said control member.

References Cited

UNITED STATES PATENTS

| | | | |
|---|---|---|---|
| 2,498,438 | 2/1950 | Du Rostu | 188—195 |
| 3,284,141 | 11/1966 | Biabaud | 303—7 |

DUANE A. REGER, *Primary Examiner.*

U.S. Cl. X.R.

188—195; 303—6